(12) United States Patent
Zargari et al.

(10) Patent No.: US 9,007,787 B2
(45) Date of Patent: Apr. 14, 2015

(54) METHOD AND APPARATUS FOR BYPASSING CASCADED H-BRIDGE (CHB) POWER CELLS AND POWER SUB CELL FOR MULTILEVEL INVERTER

(75) Inventors: Navid Zargari, Cambridge (CA); Yuan Xiao, Kitchener (CA); Lixiang Wei, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 150 days.

(21) Appl. No.: 13/572,995

(22) Filed: Aug. 13, 2012

(65) Prior Publication Data

US 2014/0042817 A1 Feb. 13, 2014

(51) Int. Cl.
*H02M 5/458* (2006.01)
*H02M 1/32* (2007.01)
*H02M 7/49* (2007.01)

(52) U.S. Cl.
CPC *H02M 1/32* (2013.01); *H02M 7/49* (2013.01); *H02M 2001/325* (2013.01)

(58) Field of Classification Search
CPC ...... H02M 5/458; H02M 5/4585; H02J 9/062
USPC ............................................. 363/37, 131, 132
See application file for complete search history.

(56) References Cited

U.S. PATENT DOCUMENTS

| | | | |
|---|---|---|---|
| 4,443,841 A | 4/1984 | Mikami et al. | |
| 4,894,621 A | 1/1990 | Koenig et al. | |
| 5,298,848 A | 3/1994 | Ueda et al. | |
| 5,361,196 A | 11/1994 | Tanamachi et al. | |
| 5,502,633 A | 3/1996 | Miyazaki et al. | |
| 5,625,545 A | 4/1997 | Hammond | |
| 5,638,263 A | 6/1997 | Opal et al. | |
| 5,642,275 A | 6/1997 | Peng et al. | |
| 5,790,396 A | 8/1998 | Miyazaki et al. | |
| 5,933,339 A | 8/1999 | Duba et al. | |
| 5,986,909 A | 11/1999 | Hammond et al. | |
| 6,005,788 A | 12/1999 | Lipo et al. | |
| 6,031,738 A | 2/2000 | Lipo et al. | |
| 6,058,031 A | 5/2000 | Lyons et al. | |
| 6,075,350 A | 6/2000 | Peng | |
| 6,222,284 B1 | 4/2001 | Hammond et al. | |
| 6,229,722 B1 * | 5/2001 | Ichikawa et al. | 363/71 |
| 6,236,580 B1 | 5/2001 | Aiello et al. | |
| 6,320,767 B1 | 11/2001 | Shimoura et al. | |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

Barbosa, Peter et al., *Active Neutral-Point-Clamped Multilevel Converters*, IEEE 0-7803-9033-4, 2005, pp. 2296-2301.

(Continued)

*Primary Examiner* — Adolf Berhane
*Assistant Examiner* — Yemane Mehari
(74) *Attorney, Agent, or Firm* — Fay Sharpe LLP

(57) ABSTRACT

Bypassing methods and apparatus are presented along with power cells and sub cells for multilevel inverters in which DC current flow into a DC link capacitance is interrupted and a bypass switch is closed across a power cell or sub cell output to selectively bypass a power stage of a multilevel inverter.

25 Claims, 7 Drawing Sheets

(56) References Cited

U.S. PATENT DOCUMENTS

| | | | |
|---|---|---|---|
| 6,411,530 | B2 | 6/2002 | Hammond et al. |
| 6,556,461 | B1 | 4/2003 | Khersonsky et al. |
| 6,697,271 | B2 | 2/2004 | Corzine |
| 6,697,274 | B2 | 2/2004 | Bernet et al. |
| 6,795,323 | B2 | 9/2004 | Tanaka et al. |
| 6,842,354 | B1 | 1/2005 | Tallam et al. |
| 7,057,905 | B2* | 6/2006 | Macmillan ...................... 363/17 |
| 7,068,526 | B2 | 6/2006 | Yamanaka |
| 7,106,025 | B1 | 9/2006 | Yin et al. |
| 7,164,254 | B2 | 1/2007 | Kerkman et al. |
| 7,170,767 | B2 | 1/2007 | Bixel |
| 7,215,559 | B2 | 5/2007 | Nondahl et al. |
| 7,428,158 | B2 | 9/2008 | Bousfield, III et al. |
| 7,568,931 | B2 | 8/2009 | Hammond |
| 7,649,281 | B2* | 1/2010 | Lai et al. ...................... 307/66 |
| 7,800,254 | B2 | 9/2010 | Hammond |
| 7,894,224 | B2 | 2/2011 | Ulrich |
| 7,978,488 | B2 | 7/2011 | Tanaka et al. |
| 8,008,923 | B2 | 8/2011 | Hammond |
| 8,093,764 | B2 | 1/2012 | Hammond |
| 8,107,267 | B2 | 1/2012 | Tallam et al. |
| 8,130,501 | B2 | 3/2012 | Ledezma et al. |
| 8,144,491 | B2 | 3/2012 | Bendre et al. |
| 8,159,840 | B2 | 4/2012 | Yun |
| 8,279,640 | B2 | 10/2012 | Abolhassani et al. |
| 8,400,793 | B2 | 3/2013 | Jonsson |
| 8,441,147 | B2 | 5/2013 | Hammond |
| 2008/0079314 | A1 | 4/2008 | Hammond |
| 2008/0174182 | A1 | 7/2008 | Hammond |
| 2009/0073622 | A1 | 3/2009 | Hammond |
| 2010/0301975 | A1 | 12/2010 | Hammond |
| 2011/0249479 | A1 | 10/2011 | Capitaneanu et al. |
| 2012/0057380 | A1 | 3/2012 | Abe |
| 2012/0113698 | A1 | 5/2012 | Inoue |
| 2013/0121042 | A1 | 5/2013 | Gan et al. |
| 2014/0063870 | A1 | 3/2014 | Bousfield, III |
| 2014/0204632 | A1 | 7/2014 | Noetzold et al. |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 2737060 | 10/2005 |
| CN | 1925289 | 3/2007 |
| EP | 0 874 448 | 10/1998 |
| EP | 1713168 A3 | 10/2006 |
| EP | 2698912 A2 | 2/2014 |
| GB | 1295261 A | 11/1972 |
| KR | 20080061641 A | 7/2008 |
| WO | WO2012105737 A1 | 8/2012 |

OTHER PUBLICATIONS

Bruckner, Thomas, et al., *The Active NPC Converter and Its Loss-Balancing Control*, IEEE Transactions on Industrial Electronics, vol. 52, No. 3, Jun. 2005, pp. 855-868.

Cengelci, E., et al., *A New Medium Voltage PWM Inverter Topology for Adjustable Speed Drives*, IEEE, 0-7803-4943-1, 1998, pp. 1416-1423.

Chaudhuri, Toufann, et al., *Introducing the Common Cross Connected Stage ($C^3S$) for the 5L ANPC Multilevel Inverter*, IEEE, 978-1-4244-1668-4, 2008, pp. 167-173.

Cheng, Zhongyuan et al., *A Novel Switching Sequence Design for Five-Level NPC/H-Bridge Inverters with Improved Output Voltage Spectrum and Minimized Device Switching Frequency*, Power Electronics, IEEE Transactions, vol. 22, Issue 6, 2007, 6 pgs.

Etxeberria-Otadui, I., et al., *Analysis of a H-NPC topology for an AC Traction Front-End Converter*, IEEE, 978-1-4244-1742-1, 2008 13$^{th}$ International Power Electronics and Motion Control Conference, pp. 1555-1561.

Floricau, Dan et al., *A new stacked NPC converter: 3L-topology and control*, Proceedings of the 12$^{th}$ European Conf. on Power Electronics and Applications, EPE 2007, EPE Association, 2007, 10 pgs.

Glinka, M., *Prototype of Multiphase Modular-Multilevel-Converter with 2 MW power rating and 17-level-output-voltage*, IEEE, 0-7803-8399-0, 2004, pp. 2572-2576.

Guennegues, V., et al., *A Converter Topology for High Speed Motor Drive Applications*, IEEE Xplore, 2009, 8 pgs.

Guennegues, V., et al., *Selective Harmonic Elimination PWM applied to H-bridge topology in high speed applications*, POWERENG, Mar. 2009, pp. 152-156.

Hiller, Mark et al., *Medium-Voltage Drives; An overview of the common converter topologies and power semiconductor devices*, IEEE Industry Applications Magazine, Mar.-Apr. 2010, pp. 22-30.

Kieferndorf, F., et al., *A New Medium Voltage Drive System Based on ANCP-5L Technology*, IEEE, 978-1-4244-5697-0, 2010, pp. 643-649.

Kouro, Samir, et al., *Recent Advances and Industrial Applications of Multilevel Converters*, IEEE Transactions on Industrial Electronics, vol. 57, No. 8, Aug. 2010, pp. 2553-2580.

Lesnicar, A., et al., *A new modular voltage source inverter topology*, Inst. of Power Electronics and Control, Muenchen, DE, Oct. 10, 2007, pp. 1-10.

Li, Jun, et al., *A New Nine-Level Active NPC (ANPC) Converter for Grid Connection of Large Wind Turboines for Distributed Generation*, IEEE Transactions on Power Electronics, vol. 26, No. 3, Mar. 2011, pp. 961-972.

Meili, Jorg et al., *Optimized Pulse Patterns for the 5-Level ANPC Converter for High Speed High Power Application*, IEEE, 1-4244-0136-4, 2006, pp. 2587-2592.

Saeedifard, Maryann et al., *Analysis and Control of DC-Capacitor-Voltage-Drift Phenomenon of a Passive Front-End Five-Level Converter*, IEEE Transactions on Industrial Electronics, vol. 54, No. 6, Dec. 2007, pp. 3255-3266.

Serpa, L.A. et al., *Five-Level Virtual-Flux Direct Power Control for the Active Neutral-Point Clamped Multilevel Inverter*, IEEE, 978-1-4244-1668-4, 2008, pp. 1668-1674.

Silva, Cesar et al., *Control of an Hybrid Multilevel Inverter for Current Waveform Improvement*, IEEE, 978-1-4244-1666-0, 2008, pp. 2329-2335.

Ulrich, James A., et al., *Floating Capacitor Voltage Regulation in Diode Clamped Hybrid Multilevel Converters*, IEEE, 978-1-4244-3439-8, 2009, pp. 197-202.

Wen, Jun et al., *Synthesis of Multilevel Converters Based on Single-and/or Three-Phase Converter Building Blocks*, IEEE Transactions on Power Electronics, vol. 23, No. 3, May 2008, pp. 1247-1256.

Wu, C.M., et al., *A Five-Level Neutral-Point-Clamped H-Bridge PWM Inverter with Superior Harmonics Suppression: A Theoretical Analysis*, IEEE, 0-7803-5471-0, 1999 V-198-V-201.

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Yantra Harvest Energy Pvt. Ltd., "Medium Voltage Drives", www.yantraharvest.com, obtained from the World Wide Web Apr. 2013.

Robicon Perfect Harmony, "The Drive of Choice for Highest Demands", Siemens, Copyright Siemens AG 2008, 16 pgs, .obtained from the World Wide Web Apr. 2013.

ASI Robicon, "Perfect Harmony MV Drive Product Overview", 18 pgs.. obtained from the World Wide Web Apr. 2013.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Wu, High-Power Converters and AC Drives. New York/Piscataway, NJ: Wiley/IEEE Press, 2006, Ch. 1.

(56) References Cited

OTHER PUBLICATIONS

Rendusara, et al., "Analysis of common mode voltage—'neutral shift' in medium voltage PWM adjustable speed drive (MV-ASD) systems", IEEE Trans. Power Electron., vol. 15, No. 6, pp. 1124-1133, Nov. 2000.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

Akagi et al., "A Passive EMI Filter for Eliminating Both Bearing Current and Ground Leakage Current From an Inverter-Driven Motor", IEEE Transactions on Power Electronics, 2006, pp. 1459-1469.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012, pp. 1152-1158.

Akagi et al., "An Approach to Eliminating High-Frequency Shaft Voltage and Ground Leakage Current From an Inverter-Driven Motor", IEEE Transactions on Industry Applications, 2004, pp. 1162-1169.

Zhu et al., An Integrated AC Choke Design for Common-Mode Current Suppression in Neutral-Connected Power Converter Systems. IEEE Transactions on Power Electronics, 2012, pp. 1228-1236.

Cavalcanti et al., "Modulation Techniques to Eliminate Leakage Currents in Transformerless Three-Phase Photovoltaic Systems", IEEE Transactions on Industrial Electronics, 2010, pp. 1360-1368.

Horvath, "How isolation transformers in MV drives protect motor insulation", TM GE Automation Systems, Roanoke, VA, 2004.

Lai et al., "Optimal common-mode voltage reduction PWM technique for inverter control with consideration of the dead-time effects—part I: basic development," IEEE Trans. Ind. Appl., vol. 40, No. 6, pp. 1605-1612, Nov./Dec. 2004.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Hava et al., "A high-performance PWM algorithm for common-mode voltage reduction in three-phase voltage source inverters," IEEE Trans. Power Electron., vol. 26, No. 7, pp. 1998-2008, Jul. 2011.

Cacciato et al., "Reduction of common mode currents in PWM inverter motor drives", IEEE Trans. Ind. Appl., vol. 35, No. 2, pp. 469â€476, Mar./Apr. 1999.

Cacciato et al., "Modified space-vector-modulation technique for common mode currents reduction and full utilization of the DC bus", in Proc. IEEE APEC Conf. Rec., 2009, pp. 109-115.

Kouro et al., "Recent advances and industrial applications of multilevel converters," IEEE Trans. Ind. Electron., vol. 57, No. 8, pp. 2553-2580, Aug. 2010.

Wu, "High-Power Converters and AC Drives", Piscataway, NJ: IEEE Press, 2006, Chapter 9.

Rodriguez et al., "Multilevel inverters: A survey of topologies, controls, and applications," IEEE Trans. Ind. Electron., vol. 49, No. 4, pp. 724-738, Aug. 2002.

Rodriguez, et al., "Multilevel voltage source—converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Guennegues et al., "Selective harmonic elimination PWM applied to H-bridge topology in high speed applications," in Proc. Int. Conf. POWERENG, Mar. 18-20, 2009, pp. 152-156.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Bruckner et al., "The active NPC converter and its loss-balancing control," IEEE Trans. Ind. Electron., vol. 52, No. 3, pp. 855-868, Jun. 2005.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

Meili et al., "Optimized pulse patterns for the 5-level ANPC converter for high speed high power applications," in Proc. 32nd IEEE IECON, Nov. 6-10, 2006, pp. 2587-2592.

Serpa et al., "Fivelevel virtual-flux direct power control for the active neutral-point clamped multilevel inverter," in Proc. IEEE Power Electron. Spec. Conf.

Kieferndorf et al., "A new medium voltage drive system based on anpc-5l technology," in Proc. IEEE-ICIT, Viña del Mar, Chile, Mar. 2010,pp. 605-611.

Barbosa et al., "Active neutral-point-clamped multilevel converters," in Proc. IEEE 36th Power Electron. Spec. Conf., Jun. 16, 2005, pp. 2296-2301.

Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Lesnicar et al., "An Innovative Modular Multilevel Converter Topology Suitable for a Wide Power Range", 2003 IEEE Bologna PowerTech Conference, Jun. 23-26, Bologna Italy, 6 pgs.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Pablo Lezana, Joseph Pou, Thierry A. Meynard, Jose Rodriguez, Salvador Ceballos and Frederic Richardeau, "Survey on Fault Operation on Multilevel Inverters", IEEE Transactions on Industrial Electronic, Vo. 57, No. 7, Jul. 2010, pp. 2207-2217.

Sanmin Wei, Bin Wu, Fahai Li and Xudong Sun, "Control Method for Cascaded H-Bridge Multilevel Inverter with Faulty Power Cells", 2003 IEEE, pp. 261-267.

Hossein Sepahvand, Mehdi Ferdowski and Keith A. Corzine, "Fault Recovery Strategy for Hybrid Cascaded H-Bridge Multi-Level Inverters", 2011 IEEE, pp. 1629-1633.

Wenchao Song and Alex Q. Huang, Control Strategy for Fault-Tolerant Cascaded Multilevel Converter based STATCOM; 2007 IEEE, pp. 1073-1076.

Hossein Iman-Eini, Shahrokh Farhangi, Jean-Luc Schanen and Mahboubeh Khakbazan-Fard, "A Fault-Tolerant Control Strategy for Cascaded H-Bridge Multilevel Rectifiers", Journal of Power Electronics, vol. 1, Jan. 2010.

Jose Rodriquez, Peter W. Hammond, Jorge Pontt, Rodrigo Musalem, Pablo Lezana and Maria Jose Escobar, "Operation of a Medium-Voltage Drive Under Faulty Conditions", 2005 IEEE, pp. 1080-1085.

Surin Khomfoi and Leon M. Tolbert, "Fault Detection and Reconfiguration Technique for Cascaded H-Bridge 11-Level Inverter Drives Operating Under Faulty Condition", 2007 IEEE, pp. 1035-1042.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Wu, Bin, "High-Power Converters and AC Drives", Chapter 7, pp. 119-142, Wiley-IEEE Press, 2006.

(56) References Cited

OTHER PUBLICATIONS

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

EE8407 Power Converter System, Topic 6 Multilevel Cascaded H-Bridge (CHB) Inverters, pp. 1-14, 2006.

Sedghi, S. et al., "A New Multilevel Carrier Based Pulse Width Modulation Method for Modular Multilevel Inverter", IEEE 8$^{th}$ International Conference on Power Electronics-ECCE Asia (ICPE & ECCE), pp. 1432-1439, May 30 to Jun. 3, 2011.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

McGrath, Brendan Peter et al., "Multicarrier PMW Strategies for Multilevel Inverters," IEEE Transactions on Industrial Electronics, vol. 49, No. 4, pp. 858-867, Aug. 2002.

European Search Report, EP Application No. 13180299.3, Completed Jun. 13, 2014, Mailed Jun. 14, 2014; the Hague, 9 pgs.

\* cited by examiner

US 9,007,787 B2

METHOD AND APPARATUS FOR BYPASSING CASCADED H-BRIDGE (CHB) POWER CELLS AND POWER SUB CELL FOR MULTILEVEL INVERTER

BACKGROUND

Multilevel inverters are sometimes employed in motor drives and other power conversion applications to generate and provide high voltage drive signals to a motor or other load in high power applications. One form of multilevel inverter is a Cascaded H-Bridge (CHB) inverter architecture, which employs multiple series-connected power stages such as H-Bridge inverters for driving each motor winding phase. Each H-Bridge is powered by a separate DC source and is driven by switch signals to generate positive or negative output voltage, with the series combination of multiple H-Bridge stages providing multilevel inverter output capability for driving a load. Device degradation within a particular power stage, however, may inhibit the ability to provide a desired output voltage to a load, particularly since the stages are connected in series with one another. Accordingly, it is desirable to provide the ability to bypass a particular degraded power stage, for example, to continue operation of a multilevel inverter at reduced output capacity and/or to bypass one or more healthy power stages to balance a power converter output to accommodate one or more degraded power stages that have also been bypassed.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

A power conversion system is provided, including power stages connected in series with one another to form a multilevel inverter. The individual power stages include a DC link circuit, a switching circuit with a plurality of switching devices to provide an output voltage, and one or more DC link control switches connected between the DC link circuit and an included or separate rectifier. A bypass switch is provided, which operates in a conductive state to bypass the output of the switching circuit. The system also includes a controller that selectively bypasses a power stage by preventing current from flowing between the rectifier and the DC link circuit using the DC link control switch, and by placing the bypass switch and a conductive state. In certain embodiments, the controller opens the DC link control switch(es) prior to closing the bypass switch. In certain embodiments, moreover, two DC link control switches are provided in first and second DC paths for selective interruption of current flow to the DC link capacitance, and one or more output control switches may be coupled between the switching circuit and the output to prevent current from flowing between the switching circuit and the output during bypass operation. The individual power stages in certain embodiments are power cells having an AC input and an associated rectifier coupled between the AC input and the DC link circuit. In other embodiments, power sub cells are used which have a DC input to receive power from an external rectifier, with the DC link control switch or switches connected between a DC input and the DC link circuit.

A power cell is presented, which may be used as a power stage in a multilevel inverter circuit. The power cell includes an AC input, a rectifier, a DC link circuit, and a switching circuit coupled between the DC link and an output. The power cell includes one or more DC link control switches coupled between the rectifier and the DC link circuit to facilitate selective interruption of current flow between the rectifier and the DC link circuit, as well as a bypass switch coupled across the switching circuit output. The power cell in certain embodiments may further include one or more output control switches selectively operable to prevent current from flowing between the switching circuit and the output.

A power sub cell is also disclosed, which includes a DC input, a DC link circuit, and a switching circuit. The sub cell includes at least one DC link control switch to selectively prevent current from flowing between the DC input and the DC link circuit, as well as a bypass switch operative in a conductive state to bypass the output of the switching circuit. In certain embodiments, the power sub cell includes one or more output control switches to selectively prevent current from flowing between the switching circuit and the output.

Methods are disclosed for bypassing a power stage of a multilevel inverter circuit, including opening at least one DC link control switch to prevent current from flowing into a DC link capacitance of the power stage, and closing a bypass switch to bypass an output of the power stage.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
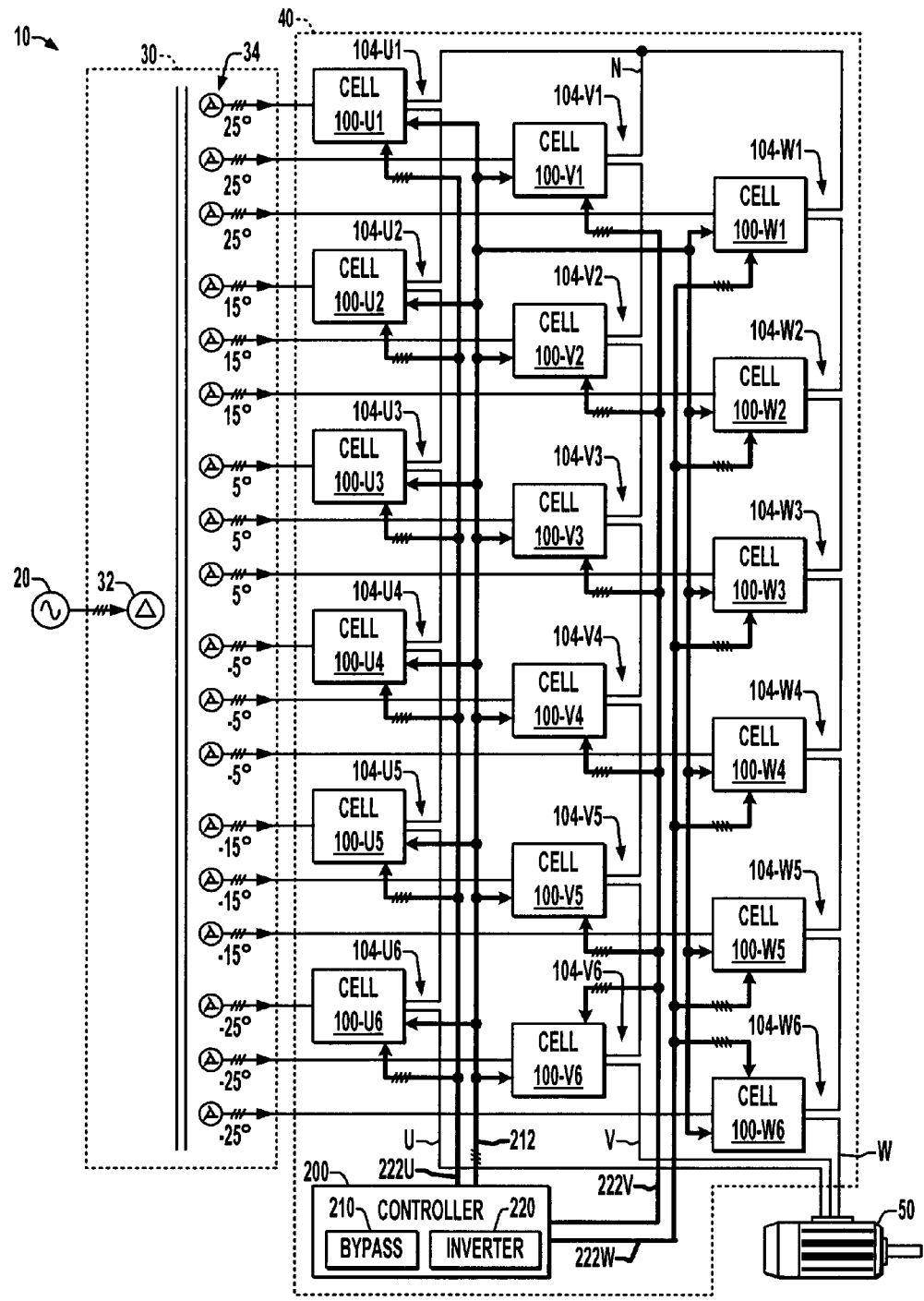
FIG. 1 is a schematic diagram illustrating a three-phase 13-level CHB inverter-based motor drive power conversion system with a controller providing switching and bypass control signals to the individual power cells.

Referring now to the figures, several embodiments or implementations are hereinafter described in conjunction with the drawings, wherein like reference numerals are used to refer to like elements throughout, and wherein the various features are not necessarily drawn to scale.

Figure 2:
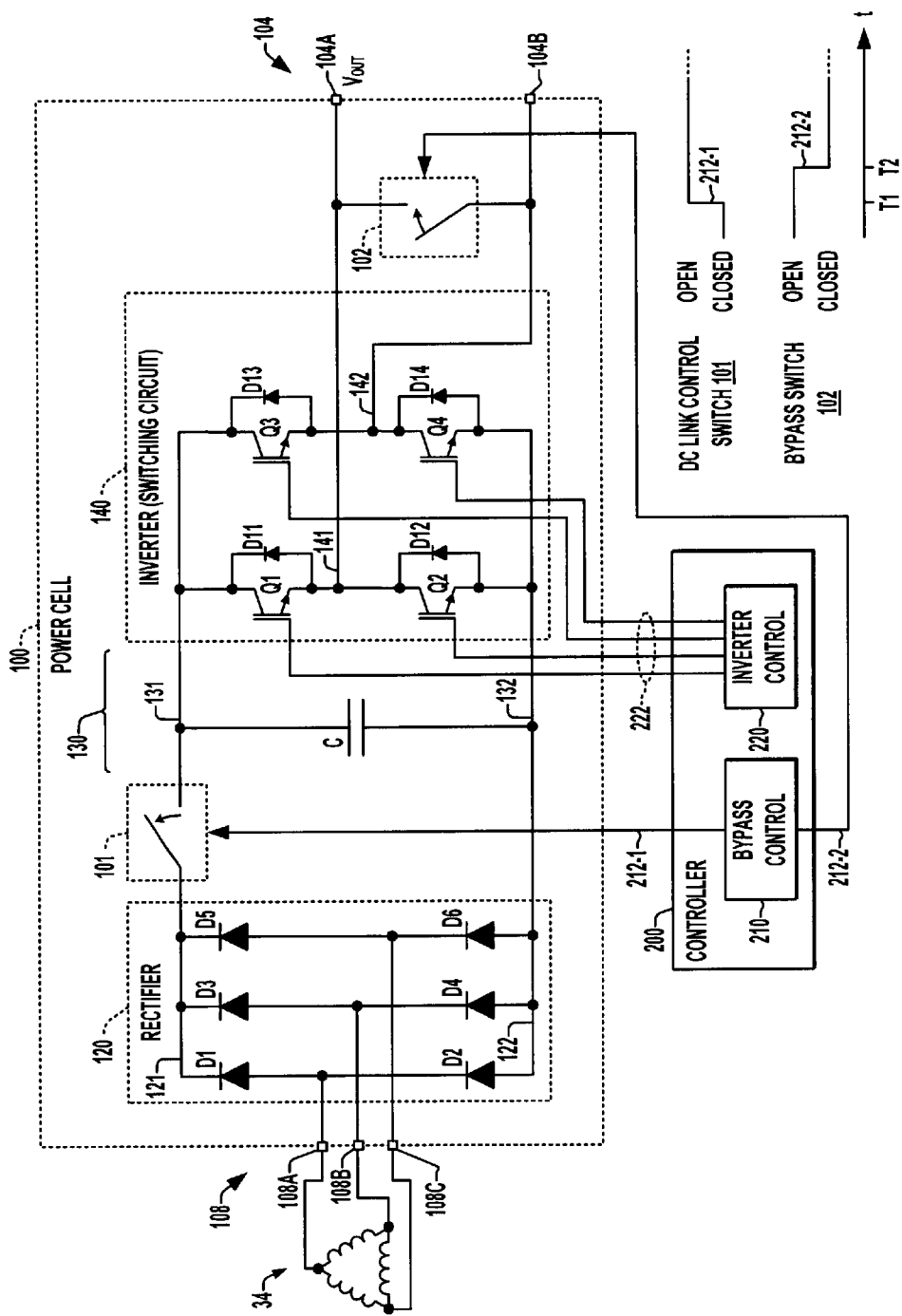
FIG. 2 is a schematic diagram illustrating an H-Bridge power cell or power stage in the power converter of FIG. 1 with a three-phase rectifier, a DC link circuit, an inverter, a DC link control switch coupled between the rectifier and the DC link circuit, and a bypass switch for bypassing the power cell.
Figure 3:
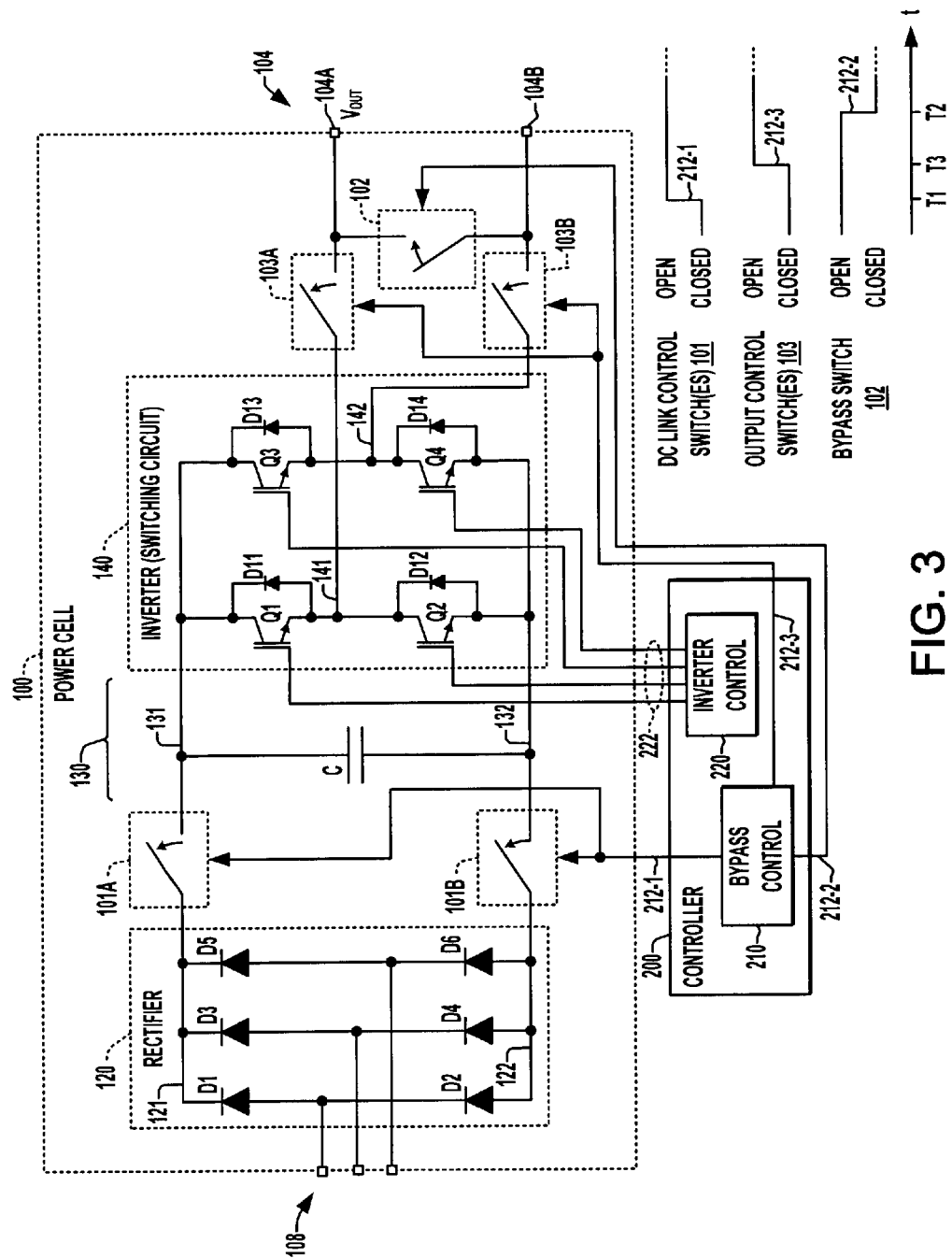
FIG. 3 is a schematic diagram illustrating another H-Bridge power cell embodiment with two DC link control switches, output control switches and a bypass switch for bypassing the power cell.

Referring initially to FIGS. 1-3, FIG. 1 illustrates an exemplary multilevel inverter motor drive power conversion system 10 which includes a three-phase multilevel inverter 40 with series-connected power stages 100-1, 100-2, 100-3, 100-4, 100-5, 100-6 for each of three sections associated with the motor phases U, V and W of a motor load 50. Other embodiments are possible in which other forms of load 50 are driven, wherein the present disclosure is not limited to motor drive type power converters. In certain embodiments, the individual power stages 100 include an H-bridge switching circuit or inverter 140 with switching devices (e.g., Q1-Q4 in FIG. 2 below), although any suitable form of switching circuit 140 may be provided in the individual power stages 100 for generating a power stage output having one of two or more possible levels according to switching control signals 222 provided by an inverter control component 220 of a power converter controller 200.

The example of FIG. 1 is a multiphase 13-level inverter 40 with six power stages 100 for each of three motor load phases U, V and W (e.g., 100-U1, 100-U2, 100-U3, 100-U4, 100-U5 and 100-U6 for phase U; 100-V1, 100-V2, 100-V3, 100-V4, 100-V5 and 100-V6 for phase V; and stages 100-W1, 100-W2, 100-W3, 100-W4, 100-W5, 100-W6 for phase W). However, the various aspects of the present disclosure may be implemented in association with single phase or multiphase, multilevel inverter type power conversion systems having any integer number "N" power stages 100, where N is greater than one. In addition, although the illustrated embodiments utilize H-Bridge stages 100 cascaded to form multilevel inverters 40 for each phase of the motor drive system 10, other types and forms of power stages 100 can be used, such as a stage 100 with a switching circuit having more or less than four switching devices, wherein the broader aspects of the present disclosure are not limited to H-Bridge power cells or sub cells shown in the illustrated embodiments. For instance, embodiments are possible, in which the individual cells or sub cells may include as few as two switching devices or any integer number of switches greater than equal to two.

As best seen in FIG. 1, the power converter 10 is supplied with multiphase AC input power from a phase shift transformer 30 having a multiphase primary 32 (a delta configuration in the illustrated embodiment) receiving three-phase power from an AC power source 20. The transformer 30 includes 18 three-phase secondaries 34, with six sets of three delta-configured three-phase secondaries 34, with each set being at a different phase relationship. Although the primary 32 and the secondaries 34 are configured as delta windings in the illustrated example, "Y" connected primary windings and/or secondary windings can alternatively be used. In addition, while the transformer has three-phase primary and secondary windings 32, 34, other single or multiphase implementations can be used. In addition, the various secondaries 34 in the illustrated embodiments are phase shifted, although non-phase shifted embodiments are possible. Each of the three-phase secondaries 34 in the example of FIG. 1 is coupled to provide AC power to drive a three-phase rectifier 120 of a corresponding power stage 100 of the three-phase multilevel inverter 40. The inverter 40 is a 13-level inverter with six cascaded H-Bridge power stages 100U-1 through 100U-6 having outputs 104U-1 through 104U-6 connected in series with one another (cascaded) between a motor drive neutral point N and a first winding U of a three-phase motor load 50. Similarly, six power stages 100V-1 through 100V-6 provide series connected voltage outputs 104V-1 through 104V-6 between the neutral N and the second winding V, and six power stages 100W-1 through 100W-6 provide series connected voltage outputs 104W-1 through 104W-6 between the neutral N and the third winding W of the motor 50. The controller 200 provides control signals 222U to the power stages 100U-1 through 100U-6 associated with the first motor winding U, and also provides control signals 222V to the power stages 100V-1 through 100V-6 and control signals 222W to the power stages 100W-1 through 100W-6.

Referring also to FIGS. 2 and 3, power cells 100 are provided for use as the power stages of single or multi-phase multilevel inverters 40, with bypass switching devices actuated by a bypass component 210 of the controller 200. The controller 200 and its components 210, 220 can be implemented using any suitable hardware, processor executed software or firmware, or combinations thereof, wherein an exemplary embodiment of the controller 200 includes one or more processing elements such as microprocessors, microcontrollers, DSPs, programmable logic, etc., along with electronic memory, program memory and signal conditioning driver circuitry, with the processing element(s) programmed or otherwise configured to generate signals 222 suitable for operating the switching devices of the power stages 100. In addition, the illustrated controller 200 in certain embodiments implements the bypass control component 210 to generate bypass control signals 212 for selective bypassing of one or more of the power stages 100.

In certain implementations, the bypass control component 210 provides individual signals or values 212 to the individual power cells 100 or sub cells 400 (FIGS. 5-7 below) for direct control over DC link control switches 101, bypass switches 102 and/or output control switches 103 (FIG. 3). In other possible implementations, local switching driver circuitry and/or switching logic can be provided within the power stages 100, 400 to implement the bypass switching operation as described herein based on one or more initiating actions from the bypass control component 210 or from any other controlling element of or associated with the power conversion system 10. For instance, a single signal or value can be provided to an individual power cell 100 or power sub cell 400, and a local logic and/or switching control circuit on the cell 100 or sub cell 400 can initiate the described bypass switching operation in response to receipt of such a signal or value.

FIG. 2 illustrates one possible implementation of an H-Bridge power stage 100. The power stage in FIG. 2 is implemented as a power cell 100 including an AC input 108 with input terminals 108A, 108B and 108C connectable to receive AC input power, in this case three-phase power from an AC source such as a secondary winding 34 of the transformer 30 in FIG. 1. The AC input power is provided from the terminals 108 to a rectifier circuit 120 having onboard rectifier diodes D1-D6 forming a three-phase rectifier 120 which receives three-phase AC power from the corresponding transformer secondary 34. In this example, a passive rectifier 120 is used, but active rectifier circuits or other forms of rectifiers can be used, whether having a single or multi-phase input. The power cell 100 also includes a DC link circuit 130 and a switching circuit (e.g., inverter 140) providing an output voltage $V_{OUT}$ to a power cell output 104 having first and second output terminals 104A and 104B. In the illustrated embodiment, the rectifier 120 provides DC power across a DC capacitor C connected between DC link terminals 131 and 132 of the DC link circuit 130.

The DC link circuit 130, in turn, provides an input to an H-Bridge inverter 140 formed by four switching devices Q1-Q4 configured in an "H" bridge circuit. Although the illustrated power stage 100 operates based on DC power provided by an internal rectifier circuitry 120 driven by an AC input from the corresponding transformer secondary 34, any suitable form of a DC input can be provided to the power stages 100 in accordance with the present disclosure, and the power stages 100 may, but need not, include onboard rectification circuitry 120. For instance, FIG. 7 below shows a power sub cell 400 with a DC input for receiving externally supplied DC input power, such as from a rectifier 120 provided as part of the transformer 30 or from an external rectifier 120 mounted in a transformer cabinet (not shown) or elsewhere within the power conversion system. In addition, any suitable switching circuit configuration can be used in the switching circuits 140 (e.g., inverter) of individual stages 100 or sub stages 400 having at least two switching devices Q configured to selectively provide voltage at the stage output 104 of at least two distinct levels. Moreover, any suitable type of switching devices Q may be used in the power stages 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc.

The illustrated four-switch H-Bridge implementation (FIG. 2) advantageously allows selective switching control signal generation by the controller 200 to provide at least two distinct voltage levels at the output 104 in a controlled fashion. For instance, a voltage is provided at the output terminals 104A and 104B of a positive DC level substantially equal to the DC bus voltage across the DC link capacitor C (e.g., +VDC) when the switching devices Q1 and Q4 are turned on (conductive) while the other devices Q2 and Q3 are off (non-conductive). Conversely, a negative output is provided when Q2 and Q3 are turned on while Q1 and Q4 are off (e.g., −VDC). Accordingly, the exemplary H-Bridge power stage 100 advantageously allows selection of two different output voltages, and the cascaded configuration of six such stages (e.g., FIG. 1) allows selective switching control signal generation by the inverter control component 220 to implement 13 different voltage levels for application to the corresponding motor phase U, V or W. It is noted that other possible switching circuitry may be used to implement a two, three, or K-level selectable output for individual stages 100, where K is any positive integer greater than 1. Any suitable logic or circuitry in the controller 200 can be used for providing inverter switching control signals 222 to a given power stage 100, 400, where the controller 200 may also include signal level amplification and/or driver circuitry (not shown) to provide suitable drive voltage and/or current levels sufficient to selectively actuate the switching devices Q1-Q4, for instance, such as comparators, carrier wave generators or digital logic and signal drivers.

For bypassing operation, the power cell 100 in FIG. 2 includes a DC link control switch 101 coupled between a first internal rectifier node 121 and a first DC link node 131 and operated in one of two possible states according to a bypass control signal 212-1 from the bypass controller 210. The DC link control switch 101 can be any suitable form of single or multiple electrical or electromechanical switching device, including without limitation semiconductor-based switches, contactors, relays, etc. In this regard, the DC link control switch 101 is operative in a first state (e.g., closed or low impedance/conductive) to allow current to flow between the first DC link node 131 and the first DC node 121 of the rectifier 120 and in a second state (open or high impedance/non-conductive) to prevent current from flowing between the first DC link node 131 and the first DC node 121 of the rectifier 120. A DC link control switch can alternatively be connected in the lower DC path between nodes 132 and 122.

In addition, the power cell 100 includes a bypass switch 102 connected across the output terminals 104 and operative according to a bypass control signal 212-2 from the controller 210. The bypass switch 102 is operative in a nonconductive state by which the cell output voltage $V_{OUT}$ is controlled by operation of the switching circuit 140, and a conductive state (e.g., closed or conductive) to bypass the output 104 of the switching circuit 140. The bypass switch 102 can be any suitable form of single or multiple electrical or electromechanical switching device.

In operation of the converter 10, the bypass controller 210 selectively bypasses the cell 100 by placing the at least one DC link control switch 101 in the second (e.g., open or non-conductive) state via signal 212-1 and by placing the bypass switch 102 in the conductive state via signal 212-2. In certain implementations, moreover, the bypass control component 210 places the bypass switch 102 in the conductive state after placing the DC link control switch 101 in the second state, such as by actuating a transition at time T1 in the bypass control signal 212-1 prior to a transition in the signal 212-2 at a later time T2 as seen in the signal diagram portion of FIG. 2. Relative timing and sequence of the switching operations is not critical in all embodiments of the present disclosure, and can be implemented in different orders and other implementations. The difference in the switching times (e.g., T2−T1) for the illustrated embodiments and switching sequences, moreover, can be any suitable length of time controlled by the bypass component 210, for instance, based on the value of the DC link capacitance C or other considerations such as operation of potentially degraded devices within the power cell 100 and/or the need to quickly bypass the power cell 100. In certain embodiments, moreover, the controller 210 may selectively adjust the bypass switching control timing according to one or more conditions in the power converter 10.

Referring also to FIG. 3, certain embodiments of the power cell 100 may include multiple DC link control switches 101 and/or one or more output control switches 103 may be provided. As shown in FIG. 3, a first DC link control switch 101A is coupled between a first DC node 121 of the rectifier 120 and the first DC link node 131, and a second DC link control switch 101B is coupled between a second DC node 122 of the rectifier 120 and the second DC link node 131. The DC link control switches 101A and 101B are individually operative in a first state (e.g., closed or conductive) to allow current to flow between the rectifier 120 and the DC link circuit 130, as well as in a second state (e.g., open or non-conductive) to prevent current from flowing between the rectifier 120 and the DC link circuit 130. In operation, the controller 200 selectively bypasses the power stage 100 by placing the first and second DC link control switches 101A and 101B (or at least one of them) in the respective second states via a control signal 212-1 and by placing the bypass switch 102 in the conductive state via signal 212-2. As noted above, in certain embodiments, the bypass control component 210 of the controller 200 actuates the DC link control switches 101 via the signal 212-1 (e.g., at T1 in the timing diagram of FIG. 3) prior to closing the bypass switch 102 via the signal 212-2 (e.g., at time T2). Although a single DC link control switching signal 212-1 is shown in the example of FIG. 3, separate DC link control signals 212-1 can be used for the individual switches 101A and 101B in other implementations, which may, but need not be switched at the same time.

The power cell of FIG. 3 also includes output control switches 103, which can be any suitable form of a single or multiple electrical or electromechanical switching device. In the illustrated embodiment, first and second output control switches 103A and 103B are provided in the connections from the inverter 140 to the output terminals 104, but other embodiments are possible using only a single output control switch 103 connected in one of these two output circuit branches. In the example of FIG. 3, the first output control switch 103A is coupled between a first internal node 141 of the switching circuit 140 and the first output terminal 104A, and the second output control switch 103B is coupled between a second internal node 142 of the switching circuit 140 and the second output terminal 104B. Each output control switch 103A and 103B in this embodiment is operative in a first (e.g., closed or conductive) state to allow current to flow between the switching circuit 140 and the output 104 and in a second (e.g., open or nonconductive) state to prevent current from flowing between the switching circuit 140 and the output 104.

The bypass control component 210 of the controller 200 selectively bypasses the power stage 100 in FIG. 3 by placing the first and second output control switches 103A and 103B in the respective second states via a single control signal 212-2, although separate control signals 212-2 can be used for the switches 103A and 103B in other embodiments. As seen in the timing diagram of FIG. 3, moreover, the bypass control component 210 in certain embodiments selectively bypasses the power cell 100 by placing the output control switch(es) 103 in the second state (e.g., via signal(s) 212-3) at time T3 in FIG. 3 after placing the DC link control switch(es) 101 in the second state (e.g., via signal(s) 212-1) at time T1, and closes the bypass switch 102 at time T2 via signal 212-2 after placing the output control switch(es) 103 in the second state. In these embodiments, the timing between the signals 212 (e.g., T3−T1 and T2−T3) can be set according to any of the above described considerations and can be selectively adjusted by the controller based on one or more power converter conditions. As discussed above, moreover, other switching sequences and/or relative timing may be implemented in other embodiments, wherein the broader aspects of the present disclosure are not limited by the illustrated examples.

Figure 4:
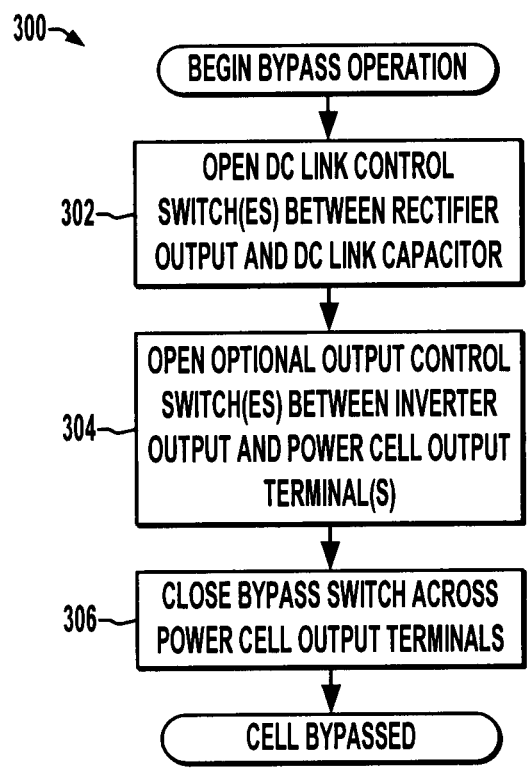
FIG. 4 is a flow diagram illustrating an exemplary method for bypassing a power cell in a multilevel inverter power conversion system.

FIG. 4 shows a process 300 for bypassing a power stage of a multilevel inverter circuit 40, such as the power cell 100 in FIG. 3 or FIG. 4 and/or a power sub cell 400 as illustrated and described below in connection with FIGS. 5-7. In certain embodiments, the controller 200 includes at least one processor programmed to perform the process 300 such as by a bypass control component 210 to provide the signals 212 to select ones of the power cells 100 or sub cells 400, along with other functionality set forth herein (e.g., providing switching control signals 222 via the inverter control component 220) according to computer executable instructions from a non-transitory computer readable medium, such as a computer memory, a memory within a power converter control system (e.g., controller 200), a CD-ROM, floppy disk, flash drive, database, server, computer, etc. which has computer executable instructions for performing the processes and controller functionality described herein. While the exemplary method 300 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide the power stage bypassing concepts disclosed herein.

The bypass operation can be initiated according to any suitable input signal received by the controller 200 in certain implementations. For instance, the power conversion controller 200 may detect one or more operating conditions of the power converter 10 indicating possible degradation of one or more power stages 100, 400, and may initiate bypassing of one or more selected cells 100 and/or sub cells 400 in response. In other possible implementations, the controller 200 may receive a signal or message from an external device (not shown) and initiate bypassing accordingly. Bypassing operation begins in the process 300 by opening at least one DC link control switch (e.g., switch 101 in FIG. 2 or switches 101A and 101B in FIG. 3 between the rectifier 120 and the DC link circuit 130) at 302 to prevent current from flowing into the DC link capacitance C of the power stage 100, 400. In certain embodiments, one or more output control switches (e.g., 103 in FIG. 3) are opened at 304 to prevent current flow between the inverter 140 and the output 104. At 306, a bypass switch (e.g., switch 102 in FIGS. 2 and 3) is closed in order to bypass the power stage output 104. As discussed above, in certain embodiments, the bypass switch 102 is closed at 306 after opening the at least one DC link control switch 101 at 302. Moreover, if one or more output control switches 103 are used between the inverter output and a power cell output, such can be opened at 304 in certain embodiments after the DC link control switch(es) is opened at 302 and before the bypass switch is closed at 306.

Figure 5:
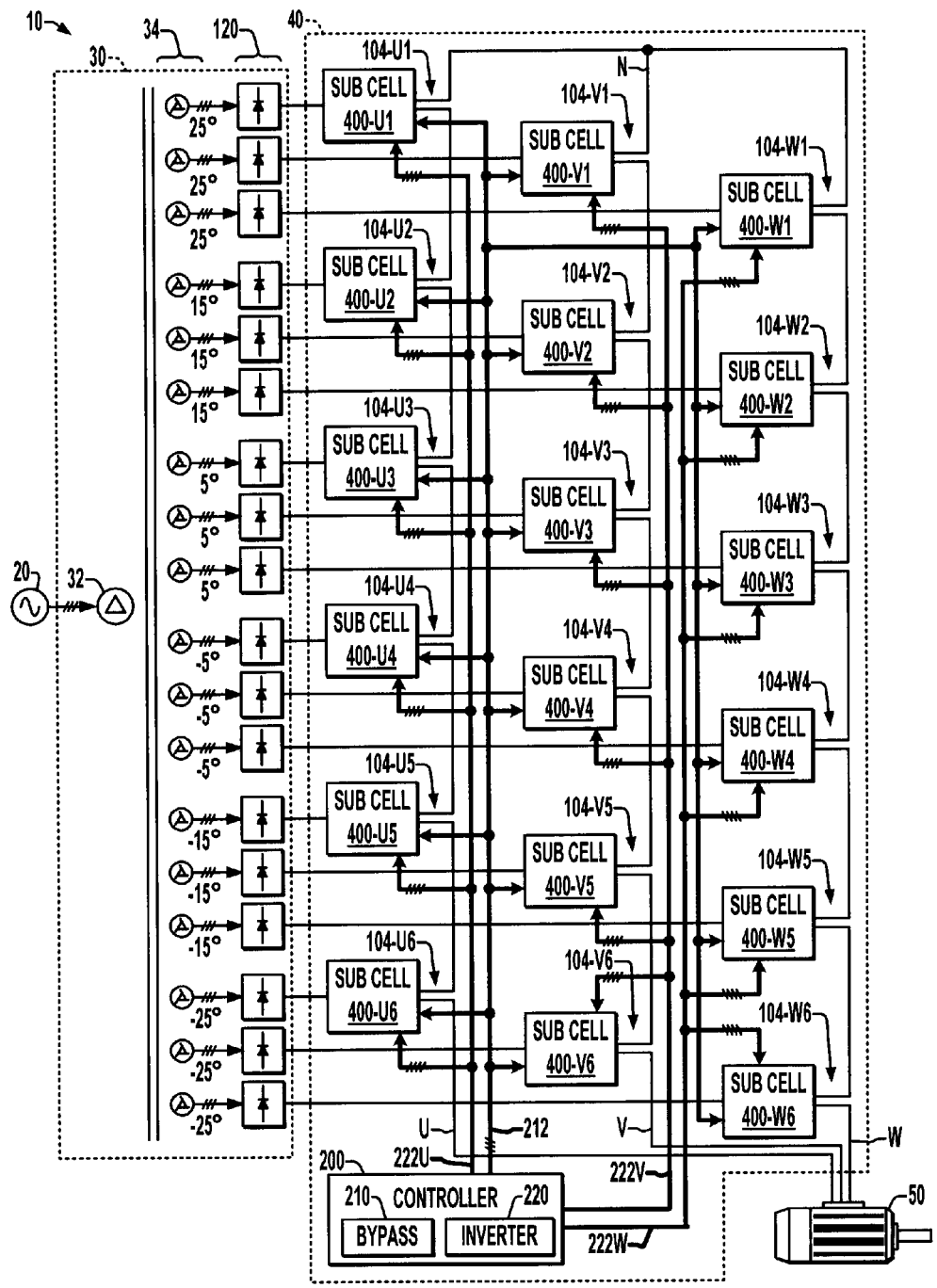
FIG. 5 is a schematic diagram illustrating another CHB power conversion system including a transformer with multiple secondaries and associated rectifiers, and multiple series-connected power sub cells providing output power to drive a motor.
Figure 6:
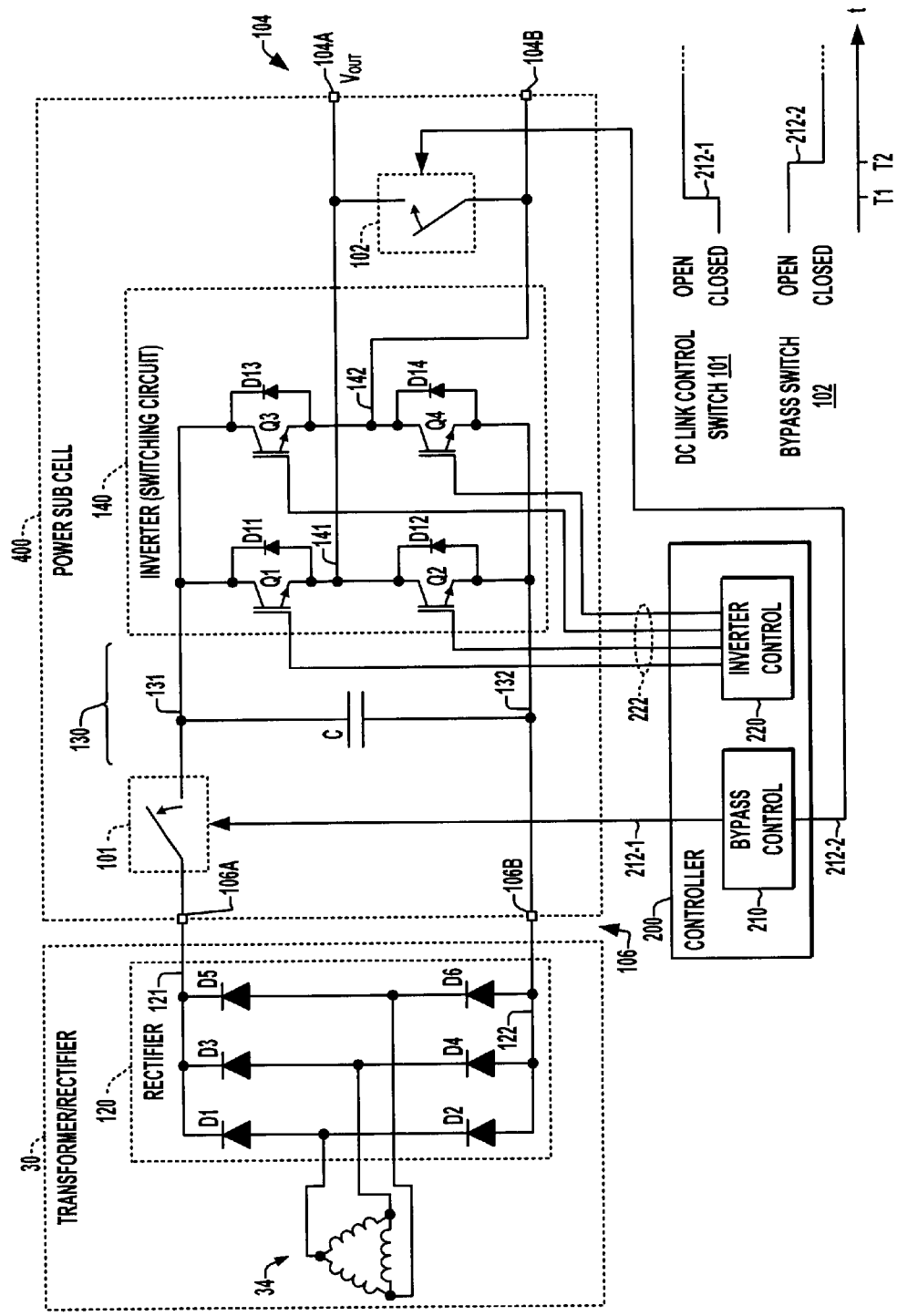
FIG. 6 is a schematic diagram illustrating a power sub cell apparatus in the power conversion system of FIG. 5 including a DC link circuit receiving DC input power from an external source, an inverter, a DC link control switch coupled between a DC sub cell input and the DC link circuit, and a bypass switch for bypassing the power sub cell.
Figure 7:
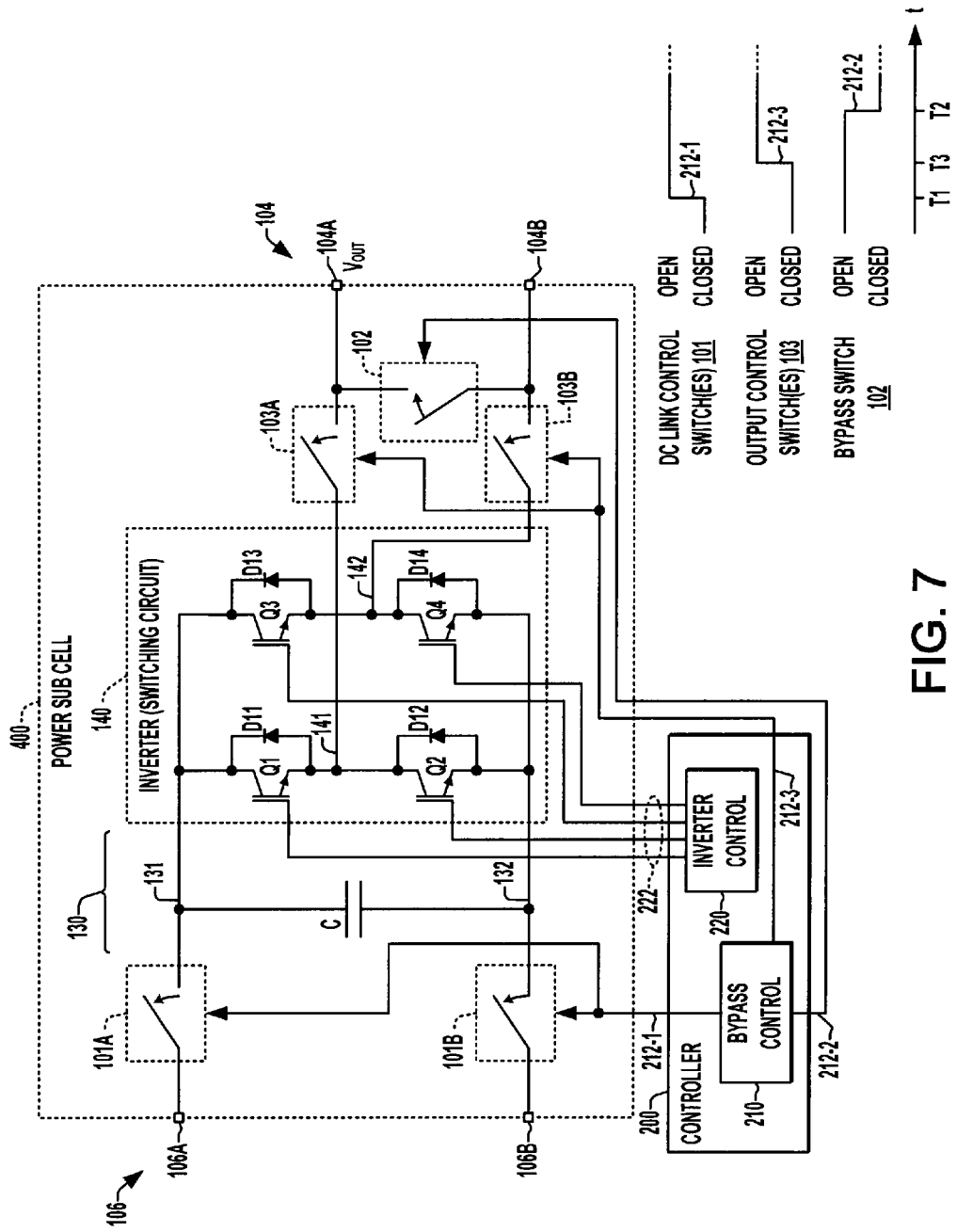
FIG. 7 is a schematic diagram illustrating another power sub cell embodiment including two DC link control switches, an output control switch and a bypass switch for bypassing the power sub cell.

Referring now to FIGS. 5-7, the above described bypass concepts can be employed in association with power conversion systems 10 having multilevel inverters 40 formed using power sub cells 400 which do not include a rectifier 120, but instead have a DC input. FIG. 5 illustrates such a power converter 10 with a three-phase multilevel inverter having six sub cells 400 connected in series for powering each motor phase U, V and W to drive a motor load 50. The basic operation and construction of the power conversion system 10 in FIG. 5 is essentially as described above in connection with FIG. 1, except that sub cells 400 are used as the power stages, and are supplied with DC input power from an external rectifier 120. As seen in the example of FIG. 5, for instance, individual rectifiers 120 may be provided as part of a transformer assembly 30, with each such rectifier 120 being connected to an associated transformer secondary 34, whether single or multiphase as described above. Each sub cell 400 in this example receives DC input power from a corresponding one of the rectifiers 120 as shown in FIG. 5. In other possible implementations, the external rectifiers 120 may be located elsewhere in the power conversion system 10, such as within a transformer cabinet (not shown) in one example. The power sub cells 400, in this regard, may be a low-cost replacement part compared with the complete power cells 100 described above. Moreover, the transformer assembly 30 or a cabinet thereof can be modified so as to integrate the rectifiers 120 in certain embodiments, and may allow for replacement of individual rectifiers 120 in certain implementations. Other embodiments in which the external rectifiers 120 are located within the power conversion system 10 may provide facilities allowing replacement of individual rectifiers 120 in certain embodiments. These implementations, moreover, may conserve wiring by routing only two DC lines to each sub cell 400 instead of connecting three AC lines to each power cell 100 (for multiphase secondaries 34).

FIG. 6 illustrates an exemplary power sub cell 400 which can be used as a power stage in a multilevel inverter circuit 40, such that shown in FIG. 5. The power sub cell 400 includes a DC input 106 with first and second DC input terminals 106A and 106B coupleable to receive DC input power from the corresponding rectifier 120. In addition, the sub cell 400 has a DC link circuit 130 and a switching circuit (e.g., converter) 140 driving an output 104 as described above in connection with FIGS. 2 and 3. The DC link circuit 130 is coupled with the DC input 106 and includes one or more capacitances C coupled between first and second DC link nodes 131 and 132 as in the above described power cells 100, wherein the inverter control component 220 of the controller 200 provides inverter switching control signals 222 for providing an output voltage $V_{OUT}$ with one of at least two discrete levels at the output 104.

For bypass operation, at least one DC link control switch 101 is coupled between the DC input 106 and the DC link circuit 130. In the example of FIG. 6, the DC link control switch 101 is connected in the upper DC branch between the input terminal 106A in the first DC link terminal 131, although other embodiments are possible in which a DC link control switch 101 is connected instead in the lower DC branch between the second DC input terminal 106B and the second DC link node 132.

Also, as seen in FIG. 7, first and second DC link control switches 101A and 101B can be provided in other embodiments, with one such DC link control switch (e.g., 101A) between the input terminal 106A and the first DC link node 131 and another switch (101B) connected between the second input terminal 106B and the second DC link node 132. Moreover, one or more output control switches 103 can be provided to selectively interrupt current flow between one or both of the inverter internal nodes 141 and/or 142 and the corresponding terminal of the output 104.

As in the above embodiments, the DC link control switch 101 in FIG. 6 (or each of the switches 101A and 101B in FIG. 7) of the power sub cell 400 is operative in first and second states to selectively allow or prevent current flow between the DC input 106 and the DC link circuit 130 under control of the bypass controller component 210 via signal(s) 212-1. In addition, the power sub cells 400 of FIGS. 6 and 7 include a bypass switch 102 coupled across the output 104 for selective output bypassing via control signal 212-2 as in the embodiments of FIGS. 2 and 3 discussed above. For bypass operation, the controller 200 provides the signals 212-1 and 212-2 to the power sub cell 400 to open the DC link control switch(es) 101 and to close the bypass switch 102, where the controller 200 in certain embodiments actuates the DC link control switch or switches 101 at time T1 prior to closing the bypass switch at time T2. Moreover, the controller can actuate any provided output control switch(es) 103, for instance, using signal(s) 212-3 at time T3 between T1 and T2 in certain embodiments.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
  a plurality of power stages connected in series to form a multilevel inverter circuit for connection to a load, the power stages individually comprising:
    a DC link circuit including at least one capacitance coupled between first and second DC link nodes,
    a switching circuit including a plurality of switching devices coupled between the DC link circuit and an output, the switching circuit operative according to a plurality of switching control signals to provide an output voltage having an amplitude of one of at least two discrete levels at the output,
    at least one DC link control switch coupled between the first DC link node and a rectifier, the at least one DC link control switch operative in a first state to allow current to flow between the first DC link node and a first DC node of the rectifier and in a second state to prevent current from flowing between the first DC link node and the first DC node of the rectifier, and
    a bypass switch coupled across the output of the switching circuit, the bypass switch operative in a nonconductive state and a conductive state to bypass the output of the switching circuit; and
  a controller coupled to control the at least one DC link control switch and the bypass switch of at least one of the plurality of power stages, the controller operative to selectively bypass the at least one power stage by placing the at least one DC link control switch in the second state and placing the bypass switch in the conductive state.

2. The power conversion system of claim 1, wherein the individual power stages comprise at least one output control switch coupled between the switching circuit and the output, the at least one output control switch operative in a first state to allow current to flow between the switching circuit and the output and in a second state to electrically disconnect the switching circuit from the output, and wherein the controller is operative to selectively bypass the at least one power stage by placing the at least one output control switch in the second state.

3. The power conversion system of claim 2, wherein the individual power stages comprise a first output control switch coupled between a first internal node of the switching circuit and a first output terminal, and a second output control switch coupled between a second internal node of the switching circuit and a second output terminal, the first and second output control switches each being operative in a first state to allow current to flow between the switching circuit and the output and in a second state to electrically disconnect the switching circuit from, and, and wherein the controller is operative to selectively bypass the at least one power stage by placing the first and second output control switches in the respective second states.

4. The power conversion system of claim 3, wherein the individual power stages comprise a first DC link control switch coupled between the first DC node of the rectifier and the first DC link node, and a second DC link control switch coupled between a second DC node of the rectifier and the second DC link node, the first and second DC link control switches each being operative in a first state to allow current to flow between the rectifier and the DC link circuit and in a second state to prevent current from flowing between the rectifier and the DC link circuit, and wherein the controller is operative to selectively bypass the at least one power stage by placing the first and second DC link control switches in the respective second states and placing the bypass switch in the conductive state.

5. The power conversion system of claim 2, wherein the individual power stages comprise a first DC link control switch coupled between the first DC node of the rectifier and the first DC link node, and a second DC link control switch coupled between a second DC node of the rectifier and the second DC link node, the first and second DC link control switches each being operative in a first state to allow current to flow between the rectifier and the DC link circuit and in a second state to prevent current from flowing between the rectifier and the DC link circuit, and wherein the controller is operative to selectively bypass the at least one power stage by placing the first and second DC link control switches in the respective second states and placing the bypass switch in the conductive state.

6. The power conversion system of claim 2, wherein the controller is operative to selectively bypass the at least one power stage by placing the at least one output control switch in the second state after placing the at least one DC link control switch in the second state, and by placing the bypass switch in the conductive state after placing the at least one output control switch in the second state.

7. The power conversion system of claim 2, wherein the individual power stages are power cells comprising an AC input and an associated rectifier coupled between the AC input and the first and second DC link nodes of the DC link circuit.

8. The power conversion system of claim 2, wherein the individual power stages are power sub cells comprising first and second DC input terminals coupled to the first and second DC link nodes of the DC link circuit to provide DC power to the DC link circuit when the at least one DC link control switch is in the first state.

9. The power conversion system of claim 1, wherein the individual power stages comprise a first DC link control switch coupled between the first DC node of the rectifier and the first DC link node, and a second DC link control switch coupled between a second DC node of the rectifier and the second DC link node, the first and second DC link control switches each being operative in a first state to allow current to flow between the rectifier and the DC link circuit and in a second state to prevent current from flowing between the rectifier and the DC link circuit, and wherein the controller is operative to selectively bypass the at least one power stage by placing the first and second DC link control switches in the respective second states and placing the bypass switch in the conductive state.

10. The power conversion system of claim 1, wherein the controller is operative to selectively bypass the at least one power stage by placing the bypass switch in the conductive state after placing the at least one DC link control switch in the second state.

11. The power conversion system of claim 1, wherein the individual power stages are power cells comprising an AC input and an associated rectifier coupled between the AC input and the first and second DC link nodes of the DC link circuit.

12. The power conversion system of claim 1, wherein the individual power stages are power sub cells comprising first and second DC input terminals coupled to the first and second DC link nodes of the DC link circuit to provide DC power to the DC link circuit when the at least one DC link control switch is in the first state.

13. A power cell for use as a power stage in a multilevel inverter circuit, the power cell comprising:
  an AC input for receiving AC input power;
  a rectifier coupled with the AC input;
  a DC link circuit coupled with the rectifier and including at least one capacitance coupled between first and second DC link nodes;
  a switching circuit including a plurality of switching devices coupled between the DC link circuit and an output, the switching circuit operative according to a plurality of switching control signals to provide an output voltage having an amplitude of one of at least two discrete levels at the output;
  at least one DC link control switch coupled between the rectifier and the DC link circuit, the at least one DC link control switch operative in a first state to allow current to flow between the rectifier and the DC link circuit and in a second state to prevent current from flowing between the rectifier and the DC link circuit; and
  a bypass switch coupled across the output of the switching circuit, the bypass switch operative in a nonconductive state and a conductive state to bypass the output of the switching circuit.

14. The power cell of claim 13, comprising at least one output control switch coupled between the switching circuit and the output, the at least one output control switch operative in a first state to allow current to flow between the switching circuit and the output and in a second state to electrically disconnect the switching circuit from the output.

15. The power cell of claim 14, comprising:
  a first output control switch coupled between a first internal node of the switching circuit and a first output terminal; and
  a second output control switch coupled between a second internal node of the switching circuit and a second output terminal;
  wherein the first and second output control switches are individually operative in a first state to allow current to flow between the switching circuit and the output and in a second state to electrically disconnect the switching circuit from the output.

16. The power cell of claim 15, comprising:
  a first DC link control switch coupled between a first DC node of the rectifier and the first DC link node; and
  a second DC link control switch coupled between a second DC node of the rectifier and the second DC link node;
  wherein the first and second DC link control switches are individually operative in a first state to allow current to flow between the rectifier and the DC link circuit and in a second state to prevent current from flowing between the rectifier and the DC link circuit.

17. The power cell of claim 14, comprising:
a first DC link control switch coupled between a first DC node of the rectifier and the first DC link node; and
a second DC link control switch coupled between a second DC node of the rectifier and the second DC link node;
wherein the first and second DC link control switches are individually operative in a first state to allow current to flow between the rectifier and the DC link circuit and in a second state to prevent current from flowing between the rectifier and the DC link circuit.

18. The power cell of claim 13, comprising:
a first DC link control switch coupled between a first DC node of the rectifier and the first DC link node; and
a second DC link control switch coupled between a second DC node of the rectifier and the second DC link node;
wherein the first and second DC link control switches are individually operative in a first state to allow current to flow between the rectifier and the DC link circuit and in a second state to prevent current from flowing between the rectifier and the DC link circuit.

19. A power sub cell for use as a power stage in a multilevel inverter circuit, the power cell comprising:
an DC input for receiving DC input power from an external source;
a DC link circuit coupled with the DC input and including at least one capacitance coupled between first and second DC link nodes;
a switching circuit including a plurality of switching devices coupled between the DC link circuit and an output, the switching circuit operative according to a plurality of switching control signals to provide an output voltage having an amplitude of one of at least two discrete levels at the output;
at least one DC link control switch coupled between the DC input and the DC link circuit, the at least one DC link control switch operative in a first state to allow current to flow between the DC input and the DC link circuit and in a second state to prevent current from flowing between the DC input and the DC link circuit; and
a bypass switch coupled across the output of the switching circuit, the bypass switch operative in a nonconductive state and a conductive state to bypass the output of the switching circuit.

20. The power sub cell of claim 19, comprising at least one output control switch coupled between the switching circuit and the output, the at least one output control switch operative in a first state to allow current to flow between the switching circuit and the output and in a second state to electrically disconnect the switching circuit from the output.

21. The power sub cell of claim 20, comprising:
a first output control switch coupled between a first internal node of the switching circuit and a first output terminal; and
a second output control switch coupled between a second internal node of the switching circuit and a second output terminal;
wherein the first and second output control switches are individually operative in a first state to allow current to flow between the switching circuit and the output and in a second state to electrically disconnect the switching circuit from the output.

22. The power sub cell of claim 21, comprising:
a first DC link control switch coupled between a first DC input node of the DC input and the first DC link node; and
a second DC link control switch coupled between a second DC input node of the DC input and the second DC link node;
wherein the first and second DC link control switches are individually operative in a first state to allow current to flow between the DC input and the DC link circuit and in a second state to prevent current from flowing between the DC input and the DC link circuit.

23. The power sub cell of claim 20, comprising:
a first DC link control switch coupled between a first DC input node of the DC input and the first DC link node; and
a second DC link control switch coupled between a second DC input node of the DC input and the second DC link node;
wherein the first and second DC link control switches are individually operative in a first state to allow current to flow between the DC input and the DC link circuit and in a second state to prevent current from flowing between the DC input and the DC link circuit.

24. The power sub cell of claim 19, comprising:
a first DC link control switch coupled between a first DC input node of the DC input and the first DC link node; and
a second DC link control switch coupled between a second DC input node of the DC input and the second DC link node;
wherein the first and second DC link control switches are individually operative in a first state to allow current to flow between the DC input and the DC link circuit and in a second state to prevent current from flowing between the DC input and the DC link circuit.

25. A method for bypassing a power stage of a multilevel inverter circuit, the method comprising:
opening at least one DC link control switch to prevent current from flowing into a DC link capacitance of the power stage; and
closing a bypass switch to bypass an output of the power stage.

* * * * *